T. N. BJORNDAHL.
DUMP RACK.
APPLICATION FILED APR. 21, 1913.

1,123,666.

Patented Jan. 5, 1915.
3 SHEETS—SHEET 1.

T. N. BJORNDAHL.
DUMP RACK.
APPLICATION FILED APR. 21, 1913.
1,123,666.
Patented Jan. 5, 1915.
3 SHEETS—SHEET 2.
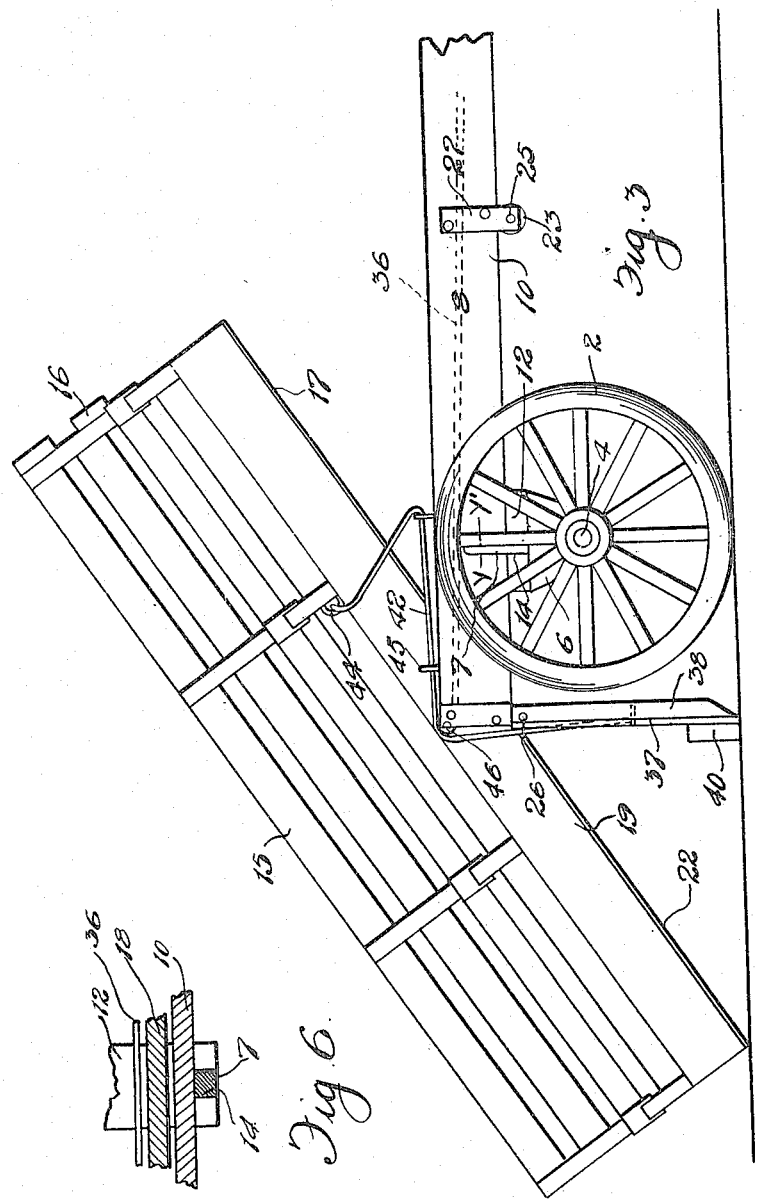

T. N. BJORNDAHL.
DUMP RACK.
APPLICATION FILED APR. 21, 1913.
1,123,666.
Patented Jan. 5, 1915.
3 SHEETS—SHEET 3.
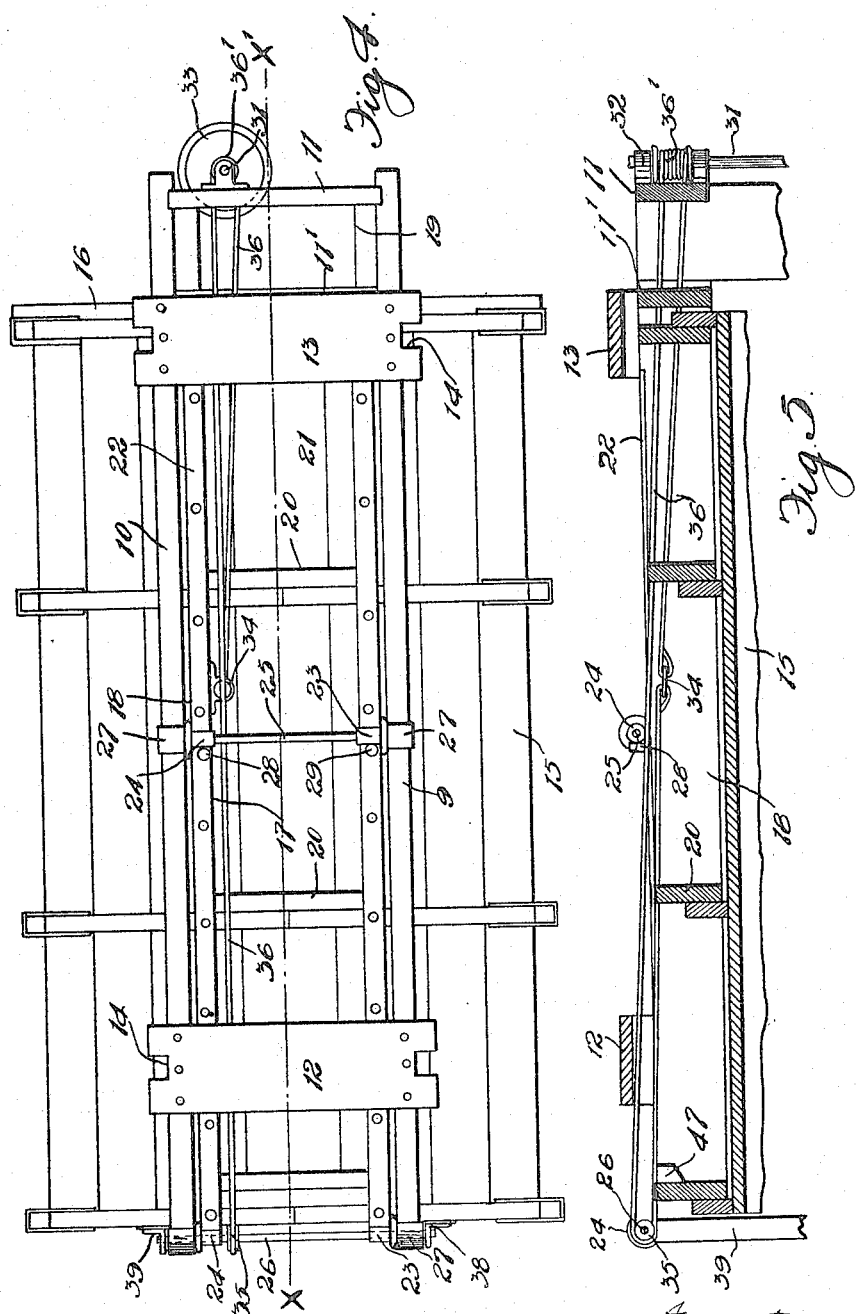

UNITED STATES PATENT OFFICE.

TOBIAS NELSON BJORNDAHL, OF WATROUS, SASKATCHEWAN, CANADA.

DUMP-RACK.

1,123,666.  Specification of Letters Patent.  Patented Jan. 5, 1915.

Application filed April 21, 1913. Serial No. 762,670.

*To all whom it may concern:*

Be it known that I, TOBIAS NELSON BJORNDAHL, of the village of Watrous, in the Province of Saskatchewan, Canada, have invented certain new and useful Improvements in Dump-Racks, of which the following is the specification.

The invention relates to a dump rack for wagons and the object of the invention is to provide a simply constructed, inexpensive and durable dump rack which can be easily operated and quickly placed on or removed from a wagon, said rack being dumped over the back end of the wagon.

A further object of the invention is to provide in combination with the rack means to effectively prevent the wagon from upsetting during the dumping operation.

With the above objects in view the invention consists essentially in an under frame, a rack slidably mounted on the frame and having the front end closed and the rear end open, means for receding or advancing the rack on the frame, stop means engageable with the rack when receding and advancing and a combination back gate and leg carried by the frame and arranged to close the back end of the rack in its normal position and to drop and support the back end of the frame when the rack is dumped, the parts being arranged and constructed as hereinafter more particularly described and later pointed out in the appended claims.

Figure 1:
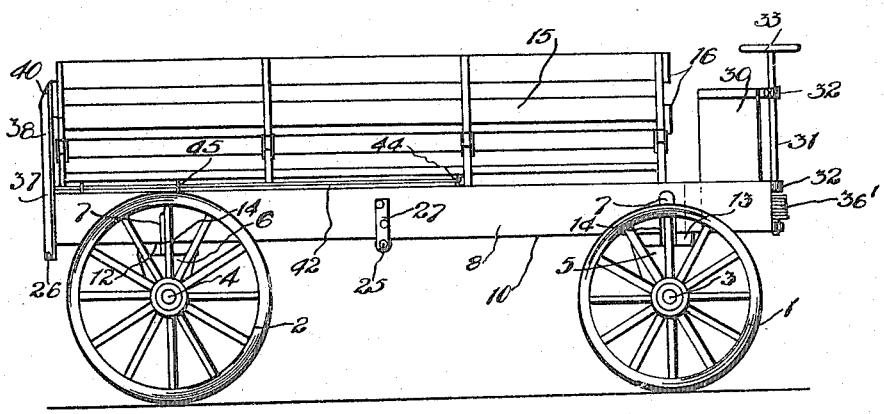
Figure 2:
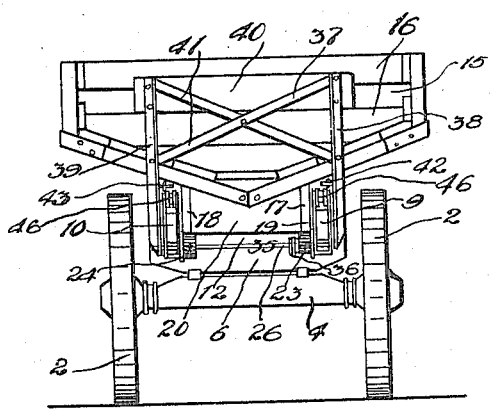

Figure 1 represents a side view of the complete invention applied on a wagon. Fig. 2 represents a rear view of the same. Fig. 3 represents an enlarged detailed side view of the rack as it appears in dumping position. Fig. 4 represents an inverted plan view of the rack detached from the wagon. Fig. 5 represents a longitudinal sectional view through the rack in the inverted position, the section being taken in the plane denoted by the line X X′ Fig. 4. Fig. 6 is a sectional view through the rear end of the under frame, the section being taken in the plane denoted by the line Y—Y′ Fig. 3.

In the drawings like characters of reference indicate corresponding parts in each figure.

1 and 2 represent the forward and rear carriage wheels of a wagon suitably mounted on the axles 3 and 4 respectively which axles carry the usual bolsters 5 and 6 supplied at the ends with the upright bolster stakes 7. The above parts are all of ordinary construction and form no part of my invention. They are simply described herein to show clearly how my rack is applied on a wagon.

8 represents the under frame of the rack which is formed from side beams 9 and 10 connected forwardly by cross beams 11 and 11′ and intermediately of their length by cross boards 12 and 13. These boards are spaced apart the same distance as the bolsters of the wagon and have their ends provided with notches 14 designed to receive the bolster stakes 7 when the frame is applied on the wagon. This construction prevents any movement of the frames when once applied on a wagon.

15 represents a rack having the forward end closed by cross pieces 16 and the rear end normally open, which rack is carried by a rack frame 17 formed from side beams 18 and 19 and intermediate spaced connecting beams 20. The beams 18 and 19 lie immediately on the inner sides of the beams 9 and 10 between which beams they are designed to slide.

Wearing plates 21 and 22 are secured to the under sides of the beams 18 and 19 which plates bear on pairs of flanged rollers 23 and 24 mounted on cross shafts 25 and 26 carried by pairs of bearing brackets 27 secured permanently to the beams 9 and 10. These rollers actually support the rack from the under frame. The track presents a pair of downwardly extending stop pins 28 and 29 arranged to engage with the rollers 23 and 24 when the rack is advanced or receded on the under frame.

30 represents a seat located at the forward end of the frame and 31 represents an upright post rotatably mounted in bearings 32 carried by the forward edge of the seat and the forward cross beam 11. The post is provided with a hand wheel 33 so that it can be readily turned.

34 is an eye or anchor block permanently secured to the inner face of the beam 18 more or less centrally of its length.

35 is a roller rotatably mounted on the rear cross shaft 26.

36 is a cable having the ends thereof permanently secured to the eye 34 and the main portion thereof passing around the roller 35 and around the lower end of the post 31. The cable is wound several times around the post 31 to form a coil 36', the arrangement being such that when the post is turned the cable winds off the lower end thereof on one side and on at the other.

37 is a combination gate and leg formed from side bars 38 of angle iron form which side bars are connected by a cross board 40 and suitably disposed cross braces 41. The ends of the bars 38 and 39 remote from the cross bar 40 are pivotally mounted on the ends of the cross shaft 26. Cables 42 and 43 are secured permanently to the bars 38 and 39 and pass forwardly more or less directly above the side beams 9 and 10 to the rack to which they are fastened by eye-bolts 44.

45 are staples driven into the upper edges of the beams 9 and 10 which staples serve to guide the cables 42 and 43.

46 are rollers located on the upper rear corners of the beams 9 and 10. The cables 42 and 43 ride over these latter rollers.

The operation of the rack is now described assuming it in the position shown in Fig. 1 of the drawings. To dump it one turns the hand wheel 33 in a direction which will cause the cable 36 to draw the rack to the rear of the under frame. As the rack passes backwardly the rear end thereof pushes the gate backwardly, the gate swinging down to the position shown in Fig. 3 of the drawings before the rack has reached the rearmost position as limited by the pins 28 and 29 engaging with the back rollers 23 and 24 on the shaft 26.

The gate is designed so that when it swings down it engages with the ground and in so doing supports the rear end of the under frame. When the rack has been withdrawn to the limiting rear position it dumps automatically as the stop pins are located in a manner such that the rack overbalances rearwardly of itself when said pins engage with the rear rollers. The rack appears as shown in Fig. 3 when in the dumped position. After the load has been dumped the attendant turns the hand wheel in the opposite direction to that just described which action causes the rack to advance and resume its original position on the under frame it being noted that the connections are such that the upper strand of the cable is at this time pulling on the eye 34 which in the dumped position is necessarily above the shaft 26. In passing forwardly the rack draws on the cables 42 and 43 and these cables operate to draw up the gate and return it back to the original position as shown in Figs. 1 and 2 of the drawings.

What I claim as my invention is;

1. The combination with a wagon frame having a slideway, of a dump rack disposed for horizontal reciprocal movement within said slideway, said rack having an open end, a gate pivotally secured to the rear end of said frame for normally closing the open end of said rack when in raised position and adapted to support the rear end of said frame when in lowered position, and means for automatically operating said gate upon the reciprocation of said frame.

2. The combination with a wagon frame having a slideway, of a dump rack disposed for horizontal reciprocal movement within said slideway, said rack having an open end, stops for limiting the reciprocal movement of said rack, a gate pivotally secured to the rear end of said frame for normally closing the open end of said rack when in raised position and adapted to support the rear end of said frame when in lowered position, means for reciprocating said rack within said slideway, and a cable for automatically operating said gate upon the reciprocation of said frame.

3. A dump wagon having a frame provided with a slideway, a rack having an open end disposed within said slideway, a gate pivotally mounted at the rear end of said frame and adapted to alternately close the open end of said rack and to support the rear end of said frame, and means for actuating said gate.

4. A dump wagon having a frame provided with a slideway, a rack disposed for horizontal reciprocal movement within said slideway, said rack having an open end, stops for limiting the reciprocal movement of said rack, a gate pivotally secured to the rear end of said frame for alternately closing the open end of said rack when in raised position and serving as a support for the rear end of said frame when in lowered position, means for reciprocating said rack within said slideway, and a cord secured to the forward end of said rack and to the gate adjacent its free end for automatically operating said gate upon the reciprocation of said frame.

Signed at Watrous this 13th day of January, 1913.

TOBIAS NELSON BJORNDAHL.

In presence of—
    KATHLEEN LOVE,
    HENRY SCHLUETER.

Copies of this patent may be obtained for five cents each, by addressing the "Commissioner of Patents, Washington, D. C."